O. C. Smith,
Piston Packing.

Nº 35,267. Patented May 13, 1862

Witnesses
James Laird
[signature]

Inventor.
O. C. Smith

UNITED STATES PATENT OFFICE.

OLIVER C. SMITH, OF SALEM, MASSACHUSETTS.

IMPROVEMENT IN PISTON-PACKING.

Specification forming part of Letters Patent No. 35,267, dated May 13, 1862.

*To all whom it may concern:*

Be it known that I, OLIVER C. SMITH, of Salem, in the county of Essex and State of Massachusetts, have invented a new and useful Improvement in Piston-Packing; and I do hereby declare that the following is a full, clear, and exact description of the same, reference being had to the accompanying drawings, forming part of this specification, in which—

Figure 1:
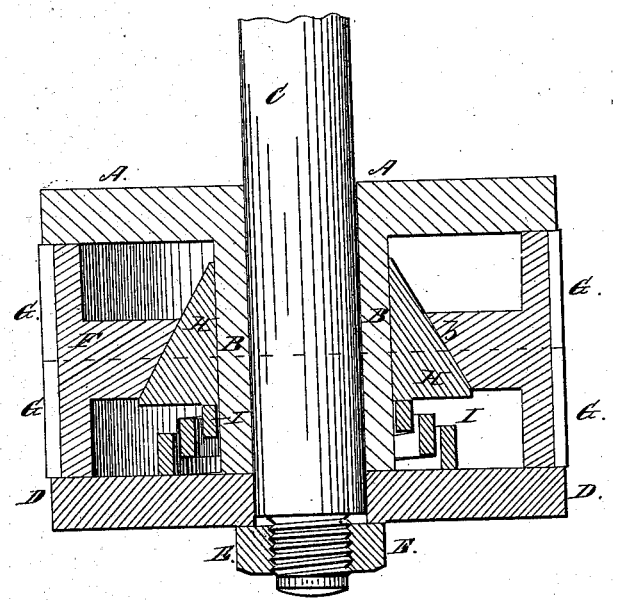
Figure 2:
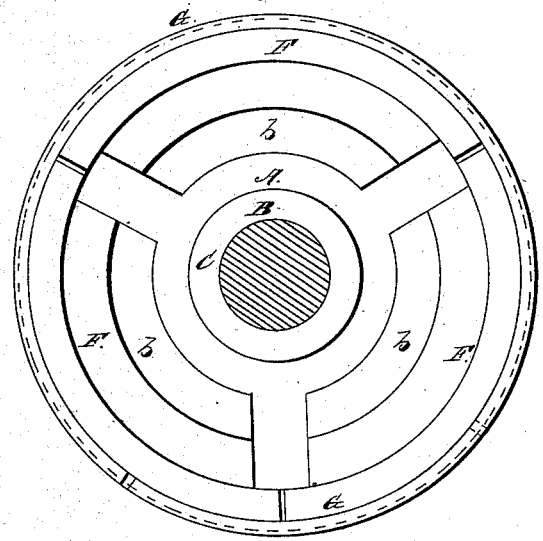

Figure 1 is an axial section of a piston with my improved packing. Fig. 2 is a view of the interior of the same as exposed to view on the under or back side by the removal of the cap or follower, spring, and expanding cone.

Similar letters of reference indicate corresponding parts in the two figures.

This invention consists in the employment, for pressing out the packing-rings, of a series of arc-formed expanding pieces fitted to the interior of the rings, a hollow cone fitted to the hub of the piston and to the interior of the arc-formed expanding pieces, and a spring coiled round the hub between the cone and the cap or follower of the piston, the whole combined and operating, substantially as hereinafter specified, to produce an outward pressure against the interior of the rings, for the purpose of holding them in contact with the cylinder and compensate for wear.

To enable others skilled in the art to make and apply my invention, I will proceed to describe its construction and operation.

A is the head of the piston, having cast with it the central hub, B, and secured firmly to the rod C.

D is the cap or follower fitted to the rod C and secured against the hub B by a nut, E, screwing onto a screw-thread, $a$, cut on the rod. The opposite faces of the head A and cap D are turned to present plane surfaces perpendicular to the axis of the rod, and the exterior of the hub B is turned to a cylindrical form concentric with the rod.

F F F are the arc-formed expanding pieces, three or more in number, (three represented,) combining to form a divided ring, the exterior of which is of cylindrical form of a circumference as much smaller than the bore of the cylinder as to leave room outside of it for the packing-rings G G. The edges of the expanding pieces are faced to fit between the flat inner faces of the head and cap, and the interiors of the said rings are turned out in conical form. The conical faces $b\ b\ b$ are shown in Fig. 2. H is the expanding cone, bored to fit and slide upon the cylindrical exterior of the hub B, and having its exterior turned to fit the conical inner surfaces of the arc-formed expanding pieces F F F.

I is the expanding-spring, of conical volute form, applied between the base of the cone H and the cap D, and secured in place and compressed to a suitable degree by the cap. The pressure of the spring I upon the cone H tends to force it toward the head A and against the conical surfaces $b\ b\ b$ of the arc-formed expanding pieces F F F, and so tends to force outward the expanding pieces against the rings G G and press the rings outward against the inner surface of the cylinder. This outward pressure against the rings being constant, keeps them out against the cylinder, compensating for wear and keeping the piston steam-tight.

What I claim as my invention, and desire to secure by Letters Patent, is—

The combination, with the head A, cap C, and packing-rings G G, of the arc-formed expanding pieces F F F, the cone H, and spring I, the whole arranged, applied, and operating substantially as herein specified.

O. C. SMITH.

Witnesses:
JAMES LAIRD,
EDW. W. HODGSON.